No. 684,423.  
E. J. GELLENBECK.  
COOKING UTENSIL.  
(Application filed Aug. 24, 1900.)  
Patented Oct. 15, 1901.

(No Model.)

Witnesses:
Monroe H. Blake
Elgie H Evans

Inventor:
Edward J. Gellenbeck
by Merwin Lothrop & Johnson
his Attorneys.

UNITED STATES PATENT OFFICE.

EDWARD J. GELLENBECK, OF SHAKOPEE, MINNESOTA.

COOKING UTENSIL.

SPECIFICATION forming part of Letters Patent No. 684,423, dated October 15, 1901.

Application filed August 24, 1900. Serial No. 27,887. (No model.)

*To all whom it may concern:*

Be it known that I, EDWARD J. GELLENBECK, a citizen of the United States, residing at Shakopee, in the county of Scott and State of Minnesota, have invented certain new and useful Improvements in Cooking Utensils, of which the following is a specification.

My invention relates to improvements in culinary utensils, its object being to provide a combination utensil which can be used for cooking articles where it is desired to retain the moisture, as in roasting; also, where it is desired to carry the moisture away from the articles, as in baking brown bread, &c., and which can also be used for boiling and frying.

To this end my invention consists in the features of construction and combination hereinafter specifically described and claimed.

Figure 1:
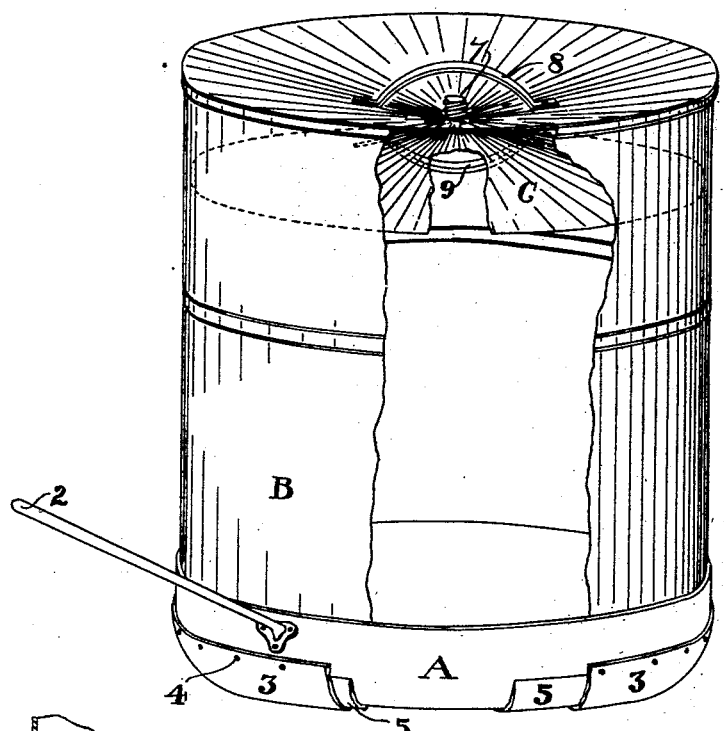
Figure 2:
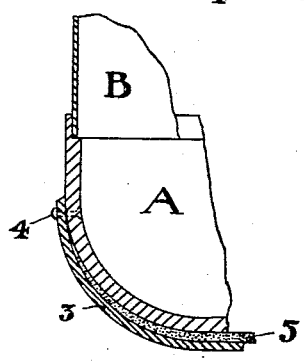
Figure 3:
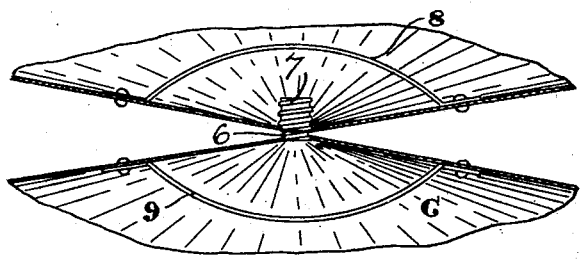

In the accompanying drawings, forming part of this specification, Figure 1 is a perspective view of my invention partially broken away the better to show the construction. Fig. 2 is a sectional detail of the bottom of the utensil, and Fig. 3 is a sectional detail of the top.

In carrying out my invention I provide a receptacle A, preferably constructed in the general outline of a stewing-skillet and provided with a handle 2. The receptacle may, however, be of any other suitable shape. The bottom of the receptacle is covered by a sheet of metal 3, secured by rivets 4 to the receptacle and holding in place a sheet of asbestos 5, arranged between it and the bottom of the receptacle. Adapted to fit within the top of the receptacle A and resting therein is a cover B, preferably made of sheet metal, the top 10 of said cover being the shape of an inverted cone with the point in the center. The bottom of the cover fits closely within the top of the receptacle A, as shown in Fig. 2. Adapted to be detachably secured in the top of the cover B is a plate C. The plate C is cone-shaped, the walls being inclined in the opposite direction to that of the top of the cover, as shown in Fig. 1. The plate is detachably secured to the top of the cover by means of a threaded neck 6, adapted to fit into a similarly-threaded cap 7, formed upon the top of the cover, as shown in Figs. 1 and 3. The cover is provided with a suitable handle 8, and the plate C is provided with a similar handle 9, by which it may be turned to secure it to the top of the cover.

My invention is designed for the cooking of a variety of articles, which ordinarily require the use of a number of different utensils. When it is desired to bake brown bread or other articles where it is desired to carry away the moisture, the apparatus is used as shown in Fig. 1. The articles being placed in the receptacle A and the cover fitted therein, the rising moisture upon striking the plate C will pass to the outer edge and drop into the receptacle outside of the articles being cooked.

When it is desired to use the utensil for the roasting of meat and other articles where it is desired to retain the moisture, the plate C is removed and the cover placed in the receptacle which contains the articles to be cooked. The rising moisture when striking the top of the cover will run to the center and drop therefrom upon the articles in the receptacle.

By removing the cover from the receptacle said receptacle may be used for the purpose of boiling, stewing, &c.

To accomplish the different purposes for which my invention is designed, I have found it important to construct the receptacle with a double bottom and secure between the walls of said bottom a sheet of asbestos.

I claim—

1. In a utensil of the class described, the combination of a receptacle, a cover constructed to fit therein, an imperforate plate detachably supported in the upper end of said cover, said plate and the top of the cover being oppositely and gradually coned or inclined.

2. In a utensil of the class described, the combination of a receptacle, a cover constructed to fit closely in the top therein, the top of said cover being of inverted-cone shape with the lowest point in the center, and a plate detachably supported inside said cover, said plate being cone-shaped with the highest point in the center.

In testimony whereof I affix my signature in presence of two witnesses.

EDWARD J. GELLENBECK.

Witnesses:
H. S. JOHNSON,
E. H. EVANS.